Patented Aug. 26, 1947

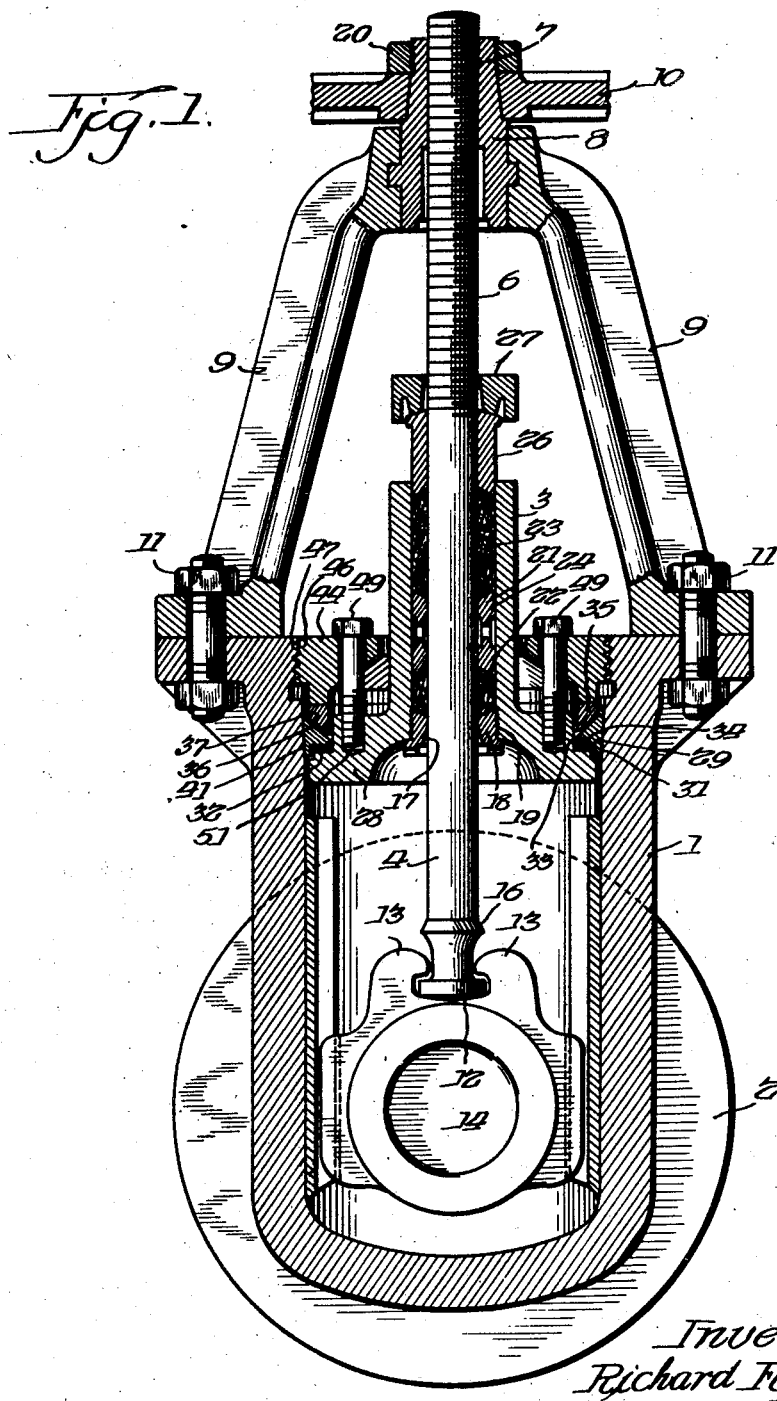

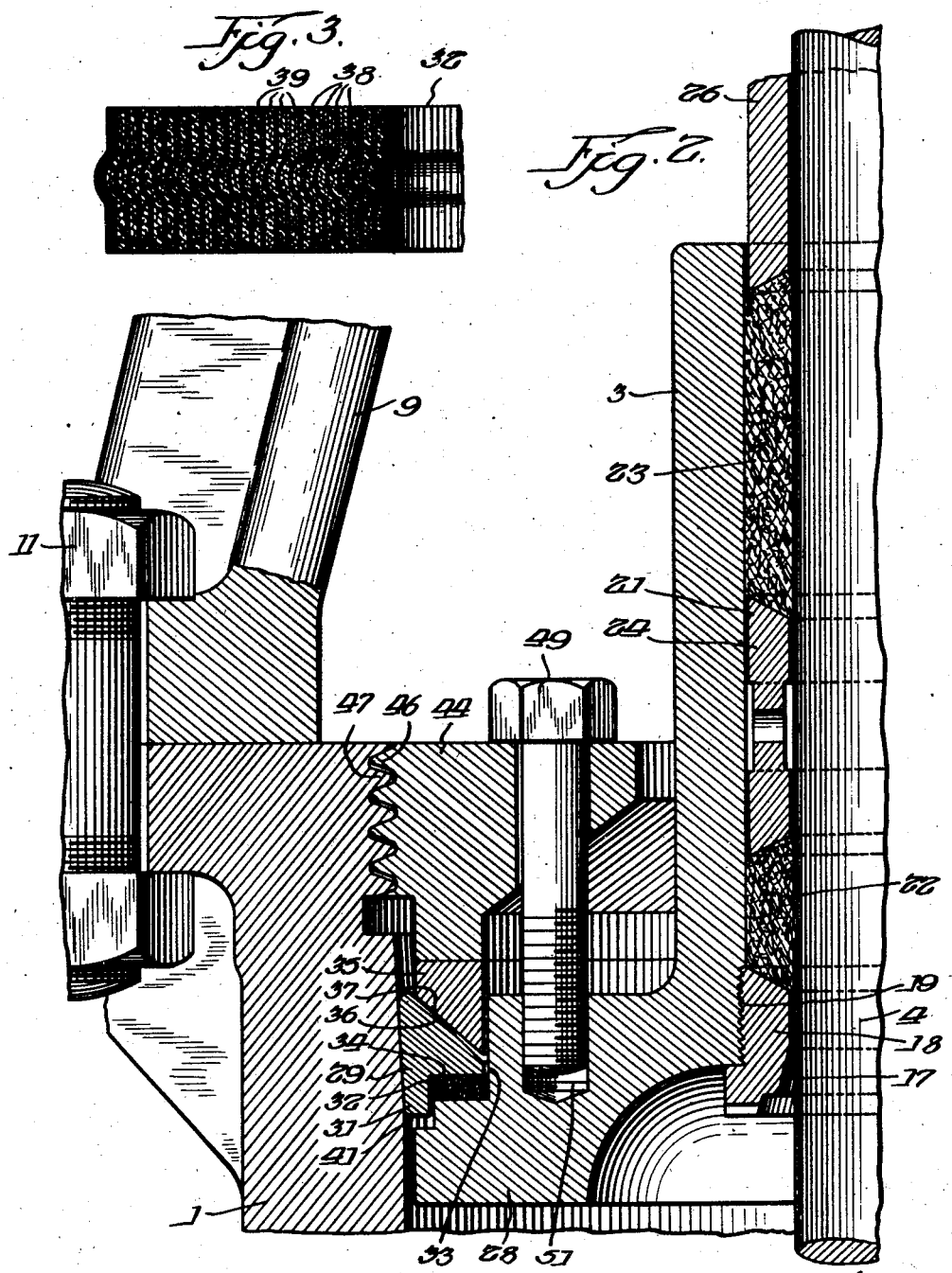

2,426,392

UNITED STATES PATENT OFFICE 2,426,392

PRESSURE SEALED JOINT

Richard Fennema, Chicago, Ill., assignor to Crane Co., Chicago, Ill., a corporation of Illinois Application April 19, 1945, Serial No. 589,117

2 Claims. (Cl. 220—46)

This invention relates to an improved type of pressure sealed joint. More particularly, it refers to a novel joint for use with valves, fittings and the like suitable for high temperatures and high pressures, and it constitutes an improvement over U. S. Patent No. 2,330,130 granted September 21, 1943, on a similar device.

It has been found that my invention may be used to special advantage as a pressure sealing joint for the above mentioned devices, especially when considering the constantly increasing pressures and temperatures to which such devices are subject when installed in normal power plant, oil refinery and similar types of services.

Another object of this invention is to provide in a pressure sealed joint means for effectually enclosing gasket sealing means and insulating the latter means against substantial or drastic temperature changes. It may be added that the latter form of service, insofar as the determination of the strength or stability of a pipe joint is concerned, is one of the most severe.

Another important object is to provide for a pressure sealed joint in which substantial advantages are gained in reducing space requirements therefor to a minimum.

A still further object is to provide a bonnet or closure joint used for a valve, fitting or the like in which the gasket member is not only substantially enclosed, but also is provided with a multi-part construction in which a differential angle is employed therebetween to produce a more durable and substantial pipe joint.

A further object is to provide in a pressure sealed joint a type of construction which may be more economically produced than those constructions heretofore provided for similar purposes.

Other purposes and advantages of my invention will become more readily apparent in connection with a reading of the detailed specification considered in light of the accompanying drawings, in which Fig. 1 shows one form of my invention as it may be employed in the body-bonnet connection of a high pressure gate valve.

Fig. 2 is an enlarged fragmentary sectional view of the pressure sealed joint itself.

Fig. 3 is an enlarged fragmentary view of a preferred form of the gasket used in combination therewith.

Similar parts are designated by similar reference characters throughout the several figures.

Referring to Fig. 1 for purposes of illustration only, a conventional valve is shown in connection with my present invention, the type of valve employed being known to those skilled in the art as a solid wedge disc gate valve. The valve comprises in general the usual parts consisting of a body or casing 1 having ports or passages therethrough which are provided with means for connection to a pipe line, for instance the flanges 2 (only one of which is shown) and which are drilled for bolting (bolt holes not being shown). The valve bonnet member generally designated 3 is connected to the casing 1 by means of my novel pressure sealed type of joint hereinafter to be described in greater detail. A stem 4, having formed at its upper end the screw threads 6 which are engaged with like threads 7 formed in a rotatable yoke sleeve 8, is adapted to move axially in opening and closing the valve upon relative rotation of the yoke sleeve 8 by means of a hand-wheel or operating lever 10 which is suitably connected thereto and is held in place by means of the wheel nut 20. The yoke sleeve 8 is thus rotatably supported by means of the individual yoke members 9 which are suitably bolted together at the upper end by means of the usual bolts (not shown) and are fastened directly to the body 1 by means of the bolts 11. This manner of attaching the yoke members is similar to that novel method disclosed in the Stark et al. Patent No. 2,305,589 granted December 22, 1942. If the conventional method were employed with a pressure sealing joint, that is by supporting the stem directly by the bonnet, it would have a serious drawback for, in raising the disc from a fully seated position, a tremendous downward force would be applied on the bonnet, possibly sufficient in some cases to break the seal or joint and eventually cause line fluid to leak past the gasket member. The novel method disclosed in the patent referred to for attaching the yoke is therefore preferred because it prevents application of longitudinal loads to the bonnet which would counteract or minimize the pressure load required to maintain a tight joint. Further, it will be apparent that it allows the bonnet 3 to "breathe" or to move slightly axially under the varying internal pressures encountered in service and to thereby maintain a fluid-tight seal at all times between the bonnet and the body.

The lowermost end of the stem 4 is provided with a conventional T-head 12 for engagement with the overhanging or hook portions 13 of the solid wedge disc or the closure member 14, the latter member being adapted to contact the seating surfaces in the casing 1 for the purpose of interrupting or stopping the flow of fluid through the valve. The stem 4 is preferably provided with a frusto-conical back-seating surface 16 which is adapted to seat against a similarly shaped surface 17 in the back-seating bushing 18 which is threaded and received within the bonnet 3 by means of the threads 19. When the stem is moved upward to the limit of its travel, the abutment of the surfaces 16 and 17 causes the packing chamber generally designated 21 to be effectively sealed from the interior of the valve, thus allowing the packing 22 or 23, or the packing spacer member 24 to be replaced or repaired without actually removing the valve from service. A cylindrical packing gland 26 has its lower end portion inserted into the packing chamber 21 and is adapted to compress the packing 23 by the downward movement of the gland follower member 27, the latter movement being accomplished by any suitable means as, for example, by vertical bolts (not shown) connecting the gland follower 27 to the bonnet 3 in the usual manner. Thus far the description hereinabove given applies to a valve construction devoid of current novelty.

Referring now more particularly to the novel, improved pressure sealing joint constituting the instant contribution, the bonnet or closure 3 has a flange 28 formed at its inner or lowermost end portion. The gasket ring 29 is preferably made of soft iron and is of substantially triangular cross-section with a lower annularly extending rim portion 31 cooperating with upper surfaces of the flange 28 to form a chamber to contain the basket 32 therebetween. The bonnet 3 at its outer portion 33 is provided with an annular surface serving to contain the inner periphery of the gasket 32 while the annular outer portion of the gasket is retained by the annular rim 31 of the gasket ring 29, the latter member having the surface 34 engaging the upper annular surface of the gasket 32.

Superposed immediately above the gasket 29 is the gasket member 35 preferably but not necessarily formed of hardened steel and provided with the tapered annular surface 37 having approximately the same angle of inclination as the inclined annular surface 36 of the gasket member 29. It has been found desirable to employ between the surfaces 36 and 37 an angular difference of approximately one degree and sloping in the direction illustrated, that is to say, the angle of the surface 37 has been made 44 degrees from the horizontal plane while the surface 36 extends at an angle of 45 degrees from the horizontal plane, thus providing initially an actual line bearing contact at the outside peripheries between the surfaces 36 and 37. The gasket member 32, as shown in greater detail in Fig. 3 is preferably constructed in a manner which has been found to give satisfactory results when used in combination with the other elements of my device as described. The gasket member 32 preferably comprises alternate concentric laminations 38 of metal and the elements 39 of asbestos or the like, the metal laminations serving as resilient supporting means while the asbestos elements function as insulating media. It should be understood that no claim is made herein concerning the novelty of the gasket 32 and it is conceivable that as service conditions vary the gasket 32 may be changed to suit both as to form or materials or both.

It will be clear that as the upper hardened ring 35 is compressed, the lower soft iron gasket member 29 is forced slightly outwardly bearing against the inner annular tapered surface 41 of the casing opening as indicated. The retaining or bonnet supporting member 44 is held relatively fixed within the casing opening by means of the coarse screw threads 46 and 47 formed on the bonnet supporting member 44 and within the casing 1 respectively. These threads may preferably be made with rounded crests and valleys in order to minimize the formation of stress concentrations and to promote increased strength per unit of threaded length. The threads are preferably formed continuous about the respective peripheries of the casing 1 and the bonnet supporting member 44 whereby the two parts are assembled by the rotation of the member 44 relative to the casing.

To assemble the valve the casing 1 is assembled with the bonnet including the stem 4, the disc 14 and the packing. The gasket members 35, 29 and 32 are placed in the order indicated in the annular space between the casing and the bonnet, the gasket member 32 resting upon the flanged portion 28 of the bonnet. The bonnet supporting member 44 is then drawn up tightly against the gasket rings 35 and 29, at the same time compressing the gasket member 32 by suitable tightening of the cap screws or bolts 49 which extend through apertured portions of the retainer 44 to engage the tapped holes 51 in the bonnet flange 28. To complete the assembly of the valve, the yoke sleeve 8 with the handwheel 10 attached by means of the wheel nut 20 threadedly engages the upper part of the stem 4 and the individual yoke members 9 are then bolted onto the casing 1, forming a direct connection between the yoke sleeve and the casing.

It will thus be apparent that the gasket member 32 is given a certain amount of initial compression by means of the cap screws 49, causing the bonnet to exert a compression force upon the gasket rings 29 and 35 whereby the fluid-sealing surfaces of the gasket 32 are urged into pressure-tight contact with the walled portions of its containing chamber, the inner and outer peripheries of the gasket being retained as previously described. The soft iron gasket 29 is well insulated by means of the gasket member 32 and by means of its softness it is forced outwardly to make a joint with the casing surface 41.

The upper gasket member 35 is preferably made of a material which resists substantial permanent deformation at high temperatures. Such materials as, for example, ordinary steel alloys possessing high moduli of elasticity and high compressive strengths have produced satisfactory results. At the same time as a material for the gasket member 29 good results have been obtained with materials having a relatively low modulus of elasticity when combined with high compressive strengths such as cast iron for example. It should be appreciated however that the materials for these gaskets may vary depending upon the service requirements.

While the disclosure herein has been particularly concerned with valves in which the joint may be associated, it should be understood that it is equally applicable to any type of pressure vessel in which convenience of access to the interior thereto must be provided under variable conditions of service.

It is the desire therefore to be limited only to the extent of the appended claims interpreted in light of the existing article.

I claim:

1. A pressure sealed joint for a valve or the like comprising a casing having an opening therein, an axially movable bonnet member within the said opening, the casing opening having a substantially unbroken tapered surface defining its annular limits, a back-up member filling a substantial portion of the said opening, the said back-up member having at its lowermost portion a substantially horizontal annular surface, the said bonnet member having an oppositely disposed surface substantially in alignment with the horizontal surface of the back-up member, the respective casing, back-up member and the bonnet surfaces providing therebetween an annular gasket chamber, an annularly divided gasket having superposed portions positioned within the said gasket chamber with a lower gasket portion abutting against the tapered surface of the casing opening and with the upper superposed gasket portion bearing against the horizontal surface of the said back-up member, the opposed surfaces of the annularly divided gaskets tapering inwardly at slightly different angles to provide an included angle therebetween, whereby the lower gasket portion is maintained in pressure sealing relation with the tapered surface of the casing opening upon predetermined axial movement of the said bonnet member, insulating means interposed in a chamber formed between an annular relieved portion of the lower member of the said divided gasket and an annular shouldered portion of the said bonnet, means for moving the said bonnet axially and thereby effecting initial compression of the said divided gasket and the said insulating means.

2. A pressure sealed joint for a pressure vessel or the like comprising a casing having a tapered opening therein, an axially movable bonnet member within the said opening, back-up means axially fixed within the said opening above the tapered portion thereof and having a lower substantially horizontal annular surface, the said bonnet member having a shouldered portion, the respective casing, back-up means and the bonnet shouldered portion providing therebetween an annular gasket chamber, a multi-part gasket comprising a pair of annular members with an included angle therebetween and positioned within the said gasket chamber, one of said members annularly abutting against the respective surfaces of the tapered opening of the casing and the other against the horizontal surface portion of the said back-up means, insulating sealing means interposed in a separate chamber formed between the lower member of the said multi-part gasket and the shouldered portion of the said bonnet, the said lower member of the said multi-part gasket having rim means on its outer lower periphery for retaining at least an outer portion of the said sealing means, whereby in cooperation with the shouldered portion of the said bonnet a complete retaining chamber for the insulating sealing means is provided said means independent of the fluid pressure for moving the said bonnet member axially to thereby provide initial compression of the said multi-part gasket and resilient insulating means, the said rim means of the lower member of the multi-part gasket normally extending below the plane of the shouldered portion of the said bonnet.

RICHARD FENNEMA.

REFERENCES CITED

The following references are of record in the file of this patent:

UNITED STATES PATENTS

| Number | Name | Date |
|---|---|---|
| 2,330,130 | Marburg | Sept. 21, 1943 |
| 2,363,526 | Hobbs | Nov. 28, 1944 |
| 2,305,589 | Stark et al. | Dec. 22, 1942 |
| 1,335,117 | Kofoed et al. | Mar. 30, 1920 |